United States Patent Office 3,635,982
Patented Jan. 18, 1972

3,635,982
AMINO-SUBSTITUTED-QUINOXALINYL-
OXAZOLIDINES AND -OXAZINES
John R. Potoski, Rosemont, and Meier E. Freed, Philadelphia, Pa., assignors to American Home Products Corporation, New York, N.Y.
No Drawing. Filed Apr. 8, 1969, Ser. No. 814,443
Int. Cl. C07d 51/70
U.S. Cl. 260—268 PH      4 Claims

ABSTRACT OF THE DISCLOSURE

Novel amino-substituted 2-quinoxalinyloxazolidine - 3-amides and -sulfonamides and 2-quinoxalinylazine-3-amides and -sulfonamides (I) are provided, with pharmacological activity as central nervous system depressants and utility to induce calming. Compounds (I) are prepared by reacting a 3-(o- or p-fluoro-phenylsulfonyl- or -benzoyl)-2-(2-quinoxalinyl)-oxazolidine or -oxazine (II) with a nucleophilic agent, e.g., a organic amine.

---

This invention relates to amino-substituted quinoxalinyloxazolidines and -oxazines; and more particularly to 2-quinoxalinyl-oxazolidine - 3 - amides and -sulfonamides and to 2-quinoxalinyl-oxazine-3-amides and -sulfonamides, wherein the 3-position substituents are amino-substituted. The compounds of this invention have pharmacological activity.

DESCRIPTION OF THE INVENTION

The compounds contemplated by this invention are those of Formula I:

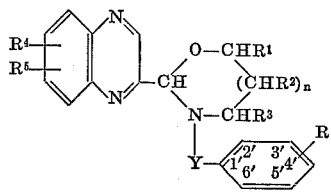

wherein
Y is CO or $SO_2$;
n is 0 or 1;
R is fixed in the 2'- or 4'-position and is

wherein A is hydrogen, (lower)alkyl or di(lower)alkylamino(lower)alkyl, and B is (lower)alkyl or di(lower)alkylamino(lower)alkyl and, when taken together, A and B form a divalent radical selected from:

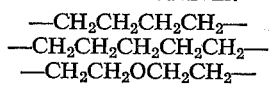
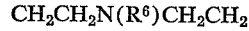

or $CH_2CH_2N(R^6)CH_2CH_2$ wherein
$R^6$ is phenyl, substituted-phenyl, phenyl- or substituted-phenyl-(lower)-alkyl or hydroxy(lower)alkyl;
$R^1$, $R^2$ and $R^3$ are hydrogen, (lower)alkyl, hydroxy(lower)alkyl, (lower)alkoxy(lower)alkyl, phenyl, substituted-phenyl or phenyl- or substituted-phenyl-(lower)alkyl; and
$R^4$ and $R^5$ are hydrogen, (lower)alkyl, nitro, chloro, amino or (lower) alkanoylamino; said substituted-phenyl groups containing from 1 to 3 substituents selected from (lower)alkyl, (lower) alkoxy, phenoxy(lower)alkyl, trifluoromethyl, nitro or chloro or a pharmacologically-acceptable acid-addition salt of said compound.

Preferred embodiments of this invention are the compound:

3-(p-piperidinophenylsulfonyl) - 2 - (2 - quinoxalinyl) oxazolidine, particularly the benzene solvate thereof; and
3 - [p - (4 - phenylpiperazino)phenylsulfonyl] - 2 - (2-quinazolinyl)oxazolidine.

Also illustrative of important embodiments are:

3-[4' - (p - chlorophenylpiperazino)phenylsulfonyl]-2-(2-quinoxalinyl) oxazolidine;
3 - (4' - pyrrolidinophenylsulfonyl) - 2 - (2 - quinoxalinyl)oxazine;
3 - (4' - dimethylaminobenzoyl) - 2 - (2 - quinoxalinyl)-4-methyl-5-phenyloxazolidine; and
3 - (4' - dimethylaminoethylaminophenylsulfonyl) - 2-[2-(6-nitroquinoxalinyl)]oxazine.

When used herein and in the appended claims, the term "(lower)alkyl" contemplates hydrocarbon groups, straight chain and branched, of from about 1 to about 6 carbon atoms, illustrative members of which are methyl, ethyl, n-propyl, i-propyl, n-butyl, t-butyl, n-pentyl, n-hexyl, 2-methylpentyl and the like. With respect to substituents $R^1$, $R^2$ and $R^3$, preferred (lower)alkyl groups have a maximum of about 3 carbon atoms. Also contemplated are analogs and derivatives of (lower)alkyl groups, such as "(lower)alkoxy" which are alkyl-O— groups wherein the alkyl group is as defined above, illustrative members of which are methoxy, ethoxy, n-propoxy, i-propoxy, n-butoxy, t-butoxy, n-pentoxy, n-hexoxy, 2-methylpentoxy and the like. "Hydroxy(lower)alkyl" contemplates (lower)alkyl groups, as defined and illustrated above, monosubstituted with a hydroxyl group. "(Lower)alkoxy(lower) alkyl" contemplates (lower)alkyl groups, as defined and illustrated above, mono-substituted with a (lower)alkoxy group defined and illustrated above. "Phenoxy(lower) alkyl" contemplates (lower)alkyl groups, as defined and illustrated above, monosubstituted with a phenoxy group. "(Lower)alkanoylamino" contemplates alkyl-CONH— of from about two to 6 carbon atoms, straight chain and branched, illustrative members of which are acetylamino, n-propionylamino, n-butanoylamino, n-pentanoylamino, n-hexanoylamino, 2-methylpentanoylamino and the like. The term "di(lower)alkylamino(lower)alkyl" contemplates the group $(alkyl)_2$N-alkylene—, wherein alkyl is (lower)alkyl as above defined and alkylene is a divalent organic hydrocarbon radical of from about 2 to 6 carbon atoms, straight chain and branched, an illustrative member of the group being dimethylaminoethyl. The term "halo" contemplates fluoro, chloro, bromo and iodo.

The compounds of this invention can be prepared by a number of methods, but a convenient procedure is outlined as follows:

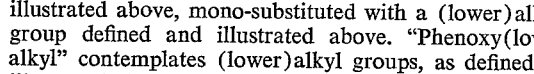

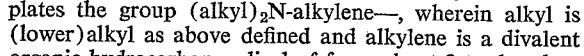

wherein F and R are fixed, respectively, in the 2'- and 4'-positions, R, $R^1$, $R^2$, $R^3$, $R^4$, $R^5$, Y and $n$ are as hereinabove defined and R: designates an organic nucleophilic reagent, e.g., a primary or secondary organic amine. The pathway comprises reacting an appropriately substituted 3-(o- or p-fluoro-phenylsulfonyl or -benzoyl)-2-(2-quinoxalinyl)-oxazolidine or -oxazine (II) with a nucleophilic reagent R: in a polar solvent until replacement of the F-substituent by an R-substituent is substantially complete, and recovering the product. Generally, a mixture of II with at least an equivalent amount (preferably about a 10% excess) of the nucleophile, R:, and an equivalent amount of an inorganic base, e.g., potassium carbonate, is suspended in from about 5 to about 30 parts by weight of a polar solvent, e.g., dimethylsulfoxide (DMSO) or dimethylformamide (DMF), based on the weight of II, and the mixture is heated, e.g., to above about 60° C. and preferably to about 95–100° C., to complete the reaction with most reactants from about 2 to about 24 hours, preferably about 6 hours, at 95° C. is adequate to provide product (I) in good yields. The product can be recovered in any usual way, but one convenient means comprises pouring the mixture into several volumes, e.g., 2–10 volumes of ice water. This causes product I to precipitate and it can be recovered by filtration. If desired, product I can be purified by recrystallization, e.g., from cyclohexane-benzene, ethyl acetate, and the like.

Since the products (I) of this invention are basic, advantage may be taken of the water solubility of salts of these compounds formed with acids in the isolation and/or purification of these compounds and in the preparation of aqueous solutions thereof for oral or parenteral administration. Of course, only pharmacologically-acceptable salts of acids should be employed in biological applications. Particularly effective salts are those formed with pharmacologically-acceptable acids having a pKa value of 3 or lower. Such acids are well known in the art, illustrative members being hydrochloric, hydrobromic, sulfuric, nitric, phosphoric, fumoric, benzenesulfonic, toluenesulfonic, methylsulfonic, ethylsulfonic and the like. The salts may be prepared by procedures commonly used in the art, for example, by reacting Compound I with an equivalent of the acid in a solvent such as alcohol or acetone, and evaporation of the mixture to dryness, which leaves the acid addition salt as a residue. Other known procedures may also be employed.

The starting materials, which are nucleophiles, R:, are typically commercially available amines or they can be obtained by entirely conventional means. Illustrative of especially useful nucleophiles (but by no means an exhaustive list) are: piperidine, 1-phenylpiperazine, p-chlorophenylpiperazine, pyrrolidine, dimethylamine, dimethylaminoethylamine and the like. The starting materials of Formula II are 2-quinoxalinyloxazolidine-3-amides and -sulfonamides and 2-quinoxalinyloxazine-3-amides and -sulfonamides which can be prepared by condensing a [(2 - quinoxalinylmethylene) - amino]alkanol (III) with a commercially-available or easily prepared m- or -p-fluoro-benzoyl- or -phenylsulfonyl-chloride (IV), Compounds (III), which those skilled in the art will recognize to be Schiff bases, can be prepared by condensing a quinoxalinyl-2-carboxaldehyde [V, prepared, e.g., by oxidizing the corresponding 2-methylquinoxalines with $SeO_2$ as described by Lanquist et al., J. Chem. Soc., 1956, p. 2052, or by an alternate procedure described by Henseke et al., Leibigs Ann. Chem. 684, 146 (1965)] with a commercially-available or easily-prepared alkanolamine (VI):

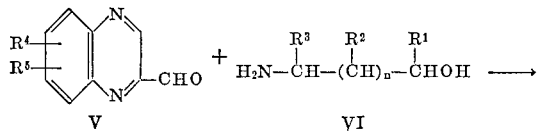

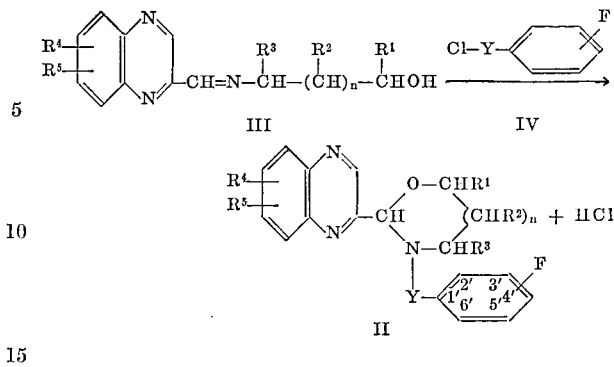

wherein Y, $n$, $R^1$, $R^2$, $R^3$, $R^4$ and $R^5$ are as hereinabove defined. In one manner of proceeding, V is condensed with VI in a reaction inert organic solvent, e.g., benzene, toluene, xylene, ether, cyclohexane, dimethylformamide, dioxane, hexane and the like, preferably benzene, for a period of from about one to about three hours, preferably about 1.5 hours at a temperature range of from about 25° C. to about the reflux temperature of the reaction mixture, removing water as an azeotrope if benzene and the like are used, until formation of III is substantially complete. One manner of recovering III is to evaporate the solvent leaving III as a residue which can be recrystallized from hexane, tetrahydrofuran, cyclohexane and the like, Compound III is then condensed with an equivalent amount or slight, e.g., 10%, excess of IV by, e.g., allowing the mixture in about 10 to 30 parts by volume of pyridine to stand at temperatures of from about 0° C. to about 30° C., but preferably at about 10° C., for from about 1 hour to about 16 hours. One means to recover II is to pour the reaction mixture into ice water, causing the product II to precipitate and it can be recovered by filtration. If desired, it can be purified by recrystallization, e.g., from chloroform-hexane, benzene-hexane, cyclohexane-benzene, and the like. These procedures are also described in detail in the copending applications of John R. Potoski and Meier E. Freed, Ser. No. 765,975, filed Oct. 8, 1968, "Schiff Bases of Quinoxaline-2-Carboxaldehydes and Their Reduction Products" (Compounds III) and John R. Potoski and Meier E. Freed, "Quinoxalinyloxazolidines and -oxazines" (Compounds III), which will be filed in the United States Patent Office on the same day as the instant application under Ser. No. 841,442, filed Apr. 8, 1969.

The compounds of Formula I and their salts of this invention have demonstrated pharmacological activity. In particular they have been found to exert a depressant action on the central nervous system when tested under standard and acceptable pharmacological procedures in laboratory animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with central nervous system depressant agents, such as the need to induce a calming effect.

The compounds of Formula I and their salts of this invention may be administered alone or in combination with other pharmacologically-active ingredients. Whether singly or in combination, they may be used in the form of solid compositions for oral administration combined, if desired, with extenders or carriers which are relatively nontoxic or inert. They may be put into tablet, capsule or powder form. On the other hand, they may be administered in liquid form as a suspension or solution in a suitable vehicle for parenteral use. By way of illustration pharmacological action as central nervous system depressant agents in mice has been demonstrated when the compound is administered at dosages of 40, 127 and 400 mg./kg.

DESCRIPTION OF THE PREFERRED EMBODIMENTS

The following examples are given by way of illustration and are not to be construed as limitations of this invention, many variations of which are possible without departing from the spirit or scope thereof.

EXAMPLE 1

3-(p-piperidinophenylsulfonyl)-2-(2-quinoxalinyl) oxazolidine, benzene solvate

A mixture of 1.8 g. (0.005 mole) of 3-(p-fluorophenylsulfonyl)-2-(2-quinoxalinyl)oxazolidine, 0.60 g. (0.007 mole) piperidine, 0.7 g. (0.005 mole) of potassium carbonate and 10 ml. of dimethylsulfoxide is heated at 95° C. (±3°) for 6 hours with stirring. The mixture is cooled and poured into 150 g. of ice water and filtered. Recrystallization of the filtered solid from cyclohexane-benzene gives 1.9 g. (82% yield) of product with M.P. 127–131° C. The analytical sample has M.P. of 128–130° C.

*Analysis.*—Calcd. for $C_{22}H_{24}N_4O_3S \cdot \frac{1}{2}C_6H_6$ (percent): C, 64.78; H, 5.87; N, 12.09; S, 6.92. Found (percent): C, 64.57; H, 5.74; N, 12.51; S, 7.13.

EXAMPLE 2

3-[p(4-phenylpiperazino)phenylsulfonyl]-2-(2-quinoxalinyl)oxazolidine

A mixture of 2.7 g. (0.0075 mole) of 3-(p-fluorophenylsulfonyl)-2-(2-quinoxalinyl)oxazolidine, 1.4 g. (0.0086 mole) 1-phenylpiperazine, 1.1 g. (0.075 mole) potassium carbonate and 15 ml. of dimethyl sulfoxide is heated at 95° C. (±3°) for 6 hours, with stirring. After cooling the mixture is poured into ice-water (150 g.) and filtered. Recrystallization from ethyl acetate affords 1.7 g. of product, M.P. 183–185° C.

EXAMPLE 3

3-[4'-(p-chlorophenylpiperazino)phenylsulfonyl]-2-(2-quinoxalinyl)oxazolidine 3-(4'-fluorophenylsulfonyl)-2-(2-quinoxalinyl)oxazolidine and p-chlorophenylpiperazine are reacted by the procedure of Example 1 and the product is obtained.

EXAMPLE 4

3-(4'-pyrrolidinophenylsulfonyl)-2-(2-quinoxalinyl) oxazine 3-(4'-fluorophenylsulfonyl)-2-(2-quinoxalinyl)oxazine and pyrrolidine are reacted by the procedure of Example 1 and the product is obtained.

EXAMPLE 5

3-(4'-dimethylaminobenzoyl)-2-(2-quinoxalinyl)-4-methyl-5-phenyloxazolidine 3-(4'-fluorobenzoyl)-2-(2-quinoxalinyl)-4 - methyl - 5-phenyloxazolidine and dimethylamine are reacted by the procedure of Example 1 and the product is obtained.

EXAMPLE 6

3-(4'-Dimethylaminoethylaminophenylsulfonyl)-2-[2-(6-nitroquinoxalinyl)]oxazine 3-(4'-fluorophenylsulfonyl - 2 - [2 - (6-nitroquinoxalinyl)]oxazine and dimethylaminoethylamine are reacted by the procedure of Example 1 and the product is obtained.

EXAMPLE 7

The procedure of Example 1 is repeated substituting appropriate Schiff bases prepared by procedures outlined in the disclosure and in the copending application(s) cited therein and appropriate amines and the following compounds of Formula I are obtained:

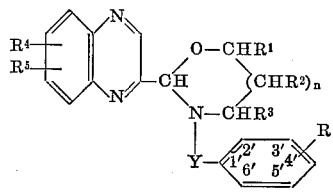

| n | $R_1$ | $R_2$ | $R_3$ | $R\!\left(-N{<}^{A\text{-}}_{B\text{-}}\right)$ | $R_4$ | $R_5$ | Y |
|---|---|---|---|---|---|---|---|
| 0 | 1 | | H | −N◯(4') | H | H | CO |
| 0 | H | | H | Same as above | H | 5-OH | $SO_2$ |
| 0 | 1 | | H | −N◯(2') | H | H | $SO_2$ |
| 0 | 1 | | H | Same as above | H | H | CO |
| 0 | H | | −◯ | −N◯(4') | 6-Cl | 7-Cl | $SO_2$ |
| 0 | H | | H | Same as above | 6-$CH_3$ | 7-$CH_3$ | $SO_2$ |
| 0 | H | | H | do | 7-$CH_3(CH_2)_2CH_2$ | H | $SO_2$ |
| 0 | H | | H | do | 6-$CH_3O$ | 7-$CH_3O$ | $SO_2$ |
| 0 | H | | H | do | 7-$CH_3CONH$ | H | $SO_2$ |
| 0 | H | | H | do | H | 7-$CH_3CH_2O$ | $SO_2$ |
| 0 | H | | H | do | 6-$CH_3O$ | 7-$CH_3$ | $SO_2$ |
| 0 | H | | H | do | 8-$CH_3(CH_2)_2CH_2$ | H | $SO_2$ |
| 0 | $CH_3$ | | H | do | H | H | $SO_2$ |
| 0 | $CH_2OH$ | | H | do | H | H | $SO_2$ |
| 0 | $CH_2OCH_3$ | | H | do | H | H | $SO_2$ |
| 0 | −◯ | | H | do | H | H | $SO_2$ |
| 0 | H | | −◯−$CH_3$ | do | H | H | $SO_2$ |
| 0 | H | | −◯−$OCH_3$ | do | H | H | $SO_2$ |
| 0 | H | | −◯−$CH_2O$−◯ | do | H | H | $SO_2$ |

| n | R₁ | R₂ | R₃ | $\left(R-N\begin{matrix}A\\B\end{matrix}\right)$ | R₄ | R₅ | Y |
|---|---|---|---|---|---|---|---|
| 0 | H | | —C₆H₄—CH₃ | ___do___ | H | H | SO₂ |
| 0 | H | | —C₆H₄—Cl | ___do___ | H | H | SO₂ |
| 0 | | —C₆H₅ | —C₆H₅ | ___do___ | H | H | SO₂ |
| 0 | H | H | H | ___do___ | 6-OH | 7-CH₃ | SO₂ |
| 0 | H | H | H | ___do___ | H | 7-CH₃CHC₂H₂O | SO₂ |
| 0 | H | H | H | ___do___ | 6-NH₂ | H | SO₂ |
| 0 | H | H | H | ___do___ | 6-NO₂ | H | SO₂ |
| 0 | H | H | —C₆H₂(OCH₃)₃ | ___do___ | H | H | SO₂ |
| 1 | H | H | H | ___do___ | H | H | SO₂ |
| 0 | H | H | | —N(CH₃)₂(4′) | H | H | SO₂ |
| 0 | H | H | | —N(n-C₆H₁₃)₂(4′) | H | H | SO₂ |
| 0 | H | H | | —NH(CH₃)(4′) | H | H | SO₂ |
| 0 | H | H | | —N(CH₃)₂(2′) | H | H | SO₂ |
| 0 | H | H | | —N[CH₂CH₂N(CH₃)₂]₃(4′) | H | H | SO₂ |
| 0 | H | H | | —N(morpholino)(4′) | H | H | SO₂ |
| 0 | H | H | | —N(piperazinyl)CH₂—C₆H₅(4′) | H | H | SO₂ |
| 0 | H | H | | —N(piperazinyl)CH₂CH₂OH(4′) | H | H | SO₂ |
| 0 | H | H | | —N(piperazinyl)—C₆H₂(OCH₃)₃(4′) | H | H | SO₂ |
| 0 | H | H | | —N(piperazinyl)—C₆H₄—CH₃(4′) | H | H | SO₂ |
| 0 | H | H | | —N(piperazinyl)—C₆H₄—NO₂(4′) | H | H | SO₂ |
| 0 | H | H | | —N(piperazinyl)—C₆H₄—O—C₆H₅(4′) | H | H | SO₂ |

EXAMPLE 8

The hydrochloric acid addition salt of 3-(p-piperidinophenylsulfonyl) - 2 - (2-quinoxalinyl)-oxazolidine is prepared by treating the compound in acetone with an isopropanolic solution of hydrogen chloride and evaporating the mixture to dryness leaving the salt as a residue. By the same procedure there are prepared the corresponding hydrobromic, sulfuric, nitric, phosphoric, fumaric, benzenesulfonic, toluenesulfonic, methylsulfonic, and ethylsulfonic acid addition salts. By this same procedure the corresponding acid-addition salts of the compounds of Examples 2–7, inclusive, are prepared.

In evaluating the instant compounds for pharmacological activity, they are tested in vivo by standard methods with the following results:

The compound is administered to three mice (CF–1 14 to 24 grams) as a 1% suspension in water to which has been added polyoxyethylene sorbitan monooleate (emulsifier) at each of the following doses: 400, 127, 40 and 12.7 mg./kg.

The animals are watched for signs of general stimulation, general depression and autonomic activity and the observations are evaluated by methods described in Turner, Screening Methods in Pharmacology, Academic Press, New York, p. 80 (1965), in the section entitled "A Test Group for Central Depressants."

3 - (p-piperidinophenylsulfonyl) - 2 - (2-quinoxalinyl) oxazolidine, benzene solvate, administered intraperitoneally, caused decreased motor activity and decreased respiration at 127 mg./kg. There were no deaths following administration of this compound at the highest dose used, 400 mg./kg.

We claim:
1. A compound of the formula:

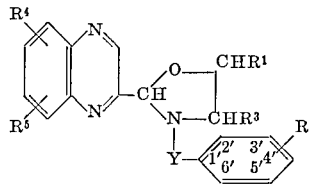

wherein Y is CO or SO₂; R is fixed in the 2′ or 4′-position and is selected from the group consisting of

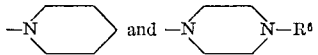

wherein R⁶ is selected from the group consisting of phenyl, and substituted phenyl; said substituted phenyl groups containing from 1 to 3 substitutents selected from the group consisting of (lower)alkyl, (lower)alkoxy, phenoxy(lower)alkyl, trifluoromethyl, nitro and chloro;

$R^1$ and $R^3$ are selected from the group consisting of hydrogen, (lower)alkyl, phenyl, substituted phenyl and substituted phenyl(lower)alkyl; wherein substituted phenyl is the same as hereinabove described; $R^4$ and $R^5$ are selected from the group consisting of hydrogen, (lower)alkyl and chloro; and the pharmacologically acceptable acid addition salts thereof.

2. A compound as defined in claim 1 which is 3-(p-piperidinophenylsulfonyl)-2-(2-quinoxalinyl)oxazolidine.

3. A compound as defined in claim 2 in the form of a benzene solvate.

4. A compound as defined in claim 1 which is 3-[p-(4-phenylpiperazino)phenyl-sulfonyl] - 2 - (2-quinoxalinyl) oxazolidine.

References Cited

Chem. Abstracts, vol. 64, 14314e, Bayer, May 1966.

HENRY R. JILES, Primary Examiner

S. D. WINTERS, Assistant Examiner

U.S. Cl. X.R.

260—250 R, 268 BC, 244 R, 247.1, 247. 5 B, 247.2 A; 424—250, 248